March 30, 1965
H. E. JOHNSON
3,175,770
LAWN SPRINKLER
Filed Aug. 26, 1963
2 Sheets-Sheet 1
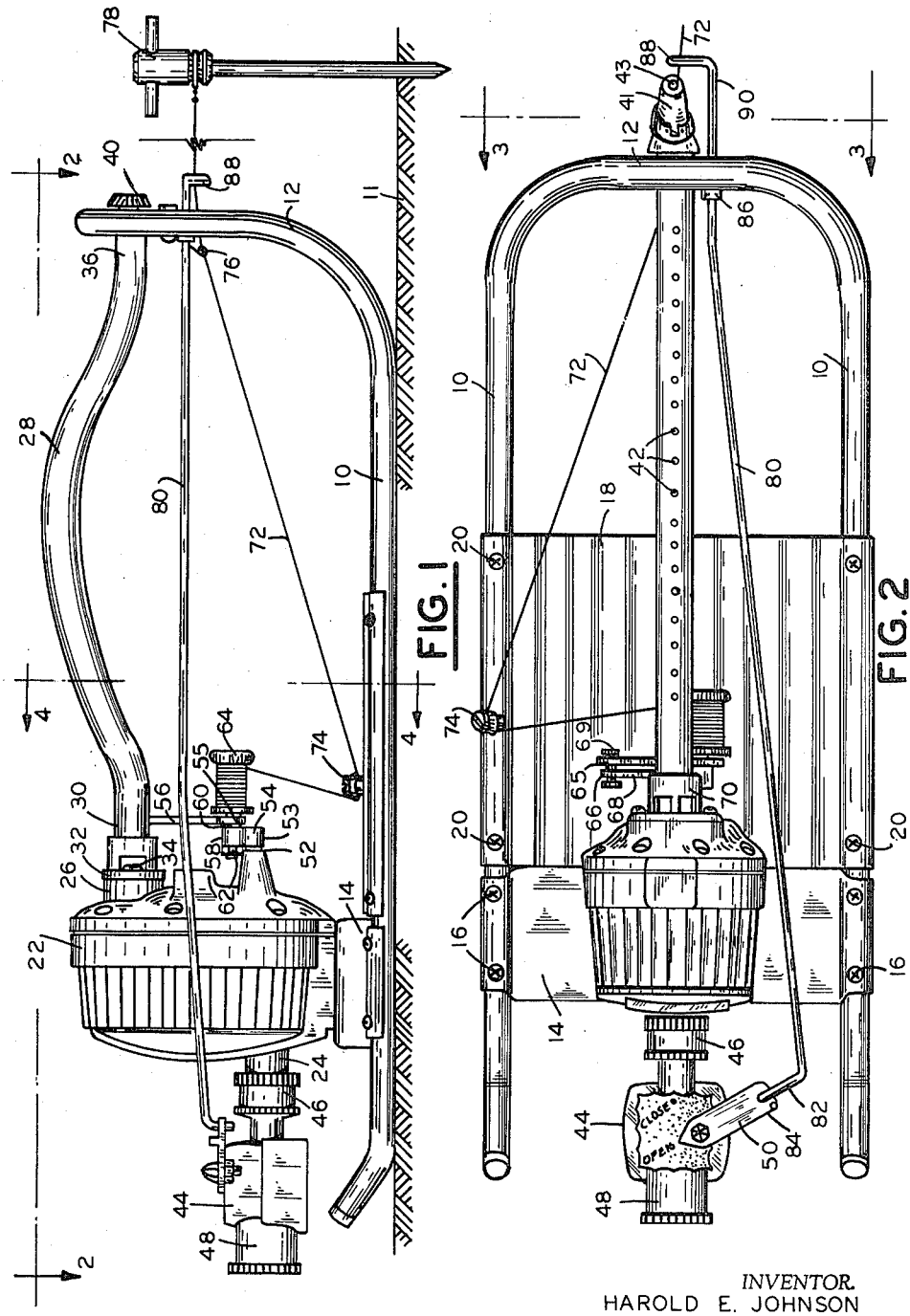
INVENTOR.
HAROLD E. JOHNSON
BY *Head & Johnson*
ATTORNEYS March 30, 1965　　　H. E. JOHNSON　　　3,175,770
LAWN SPRINKLER
Filed Aug. 26, 1963　　　　　　　　　　　2 Sheets-Sheet 2

INVENTOR.
HAROLD E. JOHNSON
BY Head & Johnson
ATTORNEYS 3,175,770
LAWN SPRINKLER
Harold E. Johnson, Midland, Tex., assignor of one-fourth to Head & Johnson, Tulsa, Okla., a partnership
Filed Aug. 26, 1963, Ser. No. 304,372
6 Claims. (Cl. 239—189)

This invention relates to a traveling lawn sprinkler. More specifically this invention relates to a lawn sprinkler that can be caused to traverse a predetermined distance across the surface being sprinkled. In particular, this invention relates to a lawn sprinkler that can be caused to traverse a predetermined distance across the surface to be sprinkled and automatically shut off when it reaches the end of its travel.

An object of this invention is to provide a traveling lawn sprinkler that is moveable in response to passage of water therethrough.

Another object of this invention is to provide a traveling lawn sprinkler having an oscillating spray head operable in response to water flowing through the sprinkler.

Another object of this invention is to provide a traveling lawn sprinkler having an automatic shut-off device for stopping the flow of the water through the sprinkler when the sprinkler reaches the end of its travel.

Another object of this invention is to provide a traveling lawn sprinkler, including an oscillating spray head, a water driven motor for oscillating the spray head and causing lateral movement of the sprinkler, and an automatic shut-off device for stopping the flow of water through the motor and sprinkler spray head when the sprinkler reaches the end of its travel.

Further objects and advantages of this invention will be apparent from the following description and appended claims, reference being had to the accompanying drawings forming a part of the specification wherein like reference characters designate corresponding parts in the several views.

FIGURE 1 is a side elevational view of the lawn sprinkler of this invention.

FIGURE 2 is a top plan view of the sprinkler of this invention.

*General description*

Figure 3:
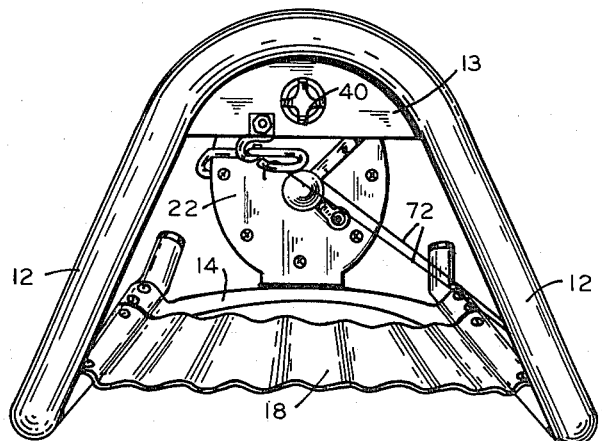
FIGURE 3 is an elevational view of the lawn sprinkler of FIGURE 2 taken along line 3—3.

In general the traveling lawn sprinkler of this invention is comprised of a sprinkler body having mounted thereon a water operated motor that is provided with a water inlet, a water outlet and a power take-off in the form of an externally extending drive shaft. The motor is operated by the flow of water through it. A water spray head, preferably of the oscillating type, is connected to the water outlet of the motor. A mechanical linkage extends from the motor drive shaft to the spray head for oscillating the spray head in response to rotation of the drive shaft. A spooling device is also connected into the mechanical linkage and is rotatable in response to rotation of the drive shaft. A flexible line is wound upon the spooling device and extends forwardly of the sprinkler to a stationary point of attachment, distant from the sprinkler. As the spooling device rotates, line is wound upon it to advance the sprinkler towards the point of attachment of the line. An externally operable valve is preferably connected into the water inlet to automatically shut off the sprinkler when it reaches the end of its travel.

*Specific description*

For a more specific description of this invention reference is now made to the drawings in general and particularly to FIGURES 1 and 2. The body of the lawn sprinkler consists chiefly of a sled-shaped tubular structure having two substantially parallel runner portions 10 for sliding engagement with the ground 11 and a forward portion 12 bent upwardly at approximately right angles to the runner portions. Forward portion 12 is substantially inverted V-shaped and is provided at its apex with gussett plate 13. A rearward support plate 14 extends between runners 10 and is attached to these runners by screws 16. Transverse guard plate 18 extends between runners 10 and is attached thereto by screws 20. As is best seen in FIGURE 2, guard plate 18 is located forwardly of and adjacent to support plate 14. Guard plate 18 functions to prevent grass or any trash-like material from contacting the moving parts of this sprinkler and becoming entangled therein to foul the working thereof.

Rigidly supported upon the central portion of the support plate 14 is a hydromotor 22. Motor 22 is provided with a rearwardly directed water inlet passage 24 and with a forwardly directed water outlet passage 26.

A substantially inverted U-shaped tubular spray head 28 extends between the water outlet 26 of hydromotor 22 and the gusset plate 13 of front portion 12. The rearward end 30 of spray head 28 is rotatably attached to the water outlet 26 by means of plate 32 and screw 34. The forward end 36 of spray head 28 extends through gusset plate 13 and is rotatably locked thereto by means of nut 40. Nut 40 also serves as a stopper for the forward end portion 36 of the spray head 28 to prevent escape of water therefrom. Nut 40 can be replaced with a nozzle 41 of the type shown in FIGURE 2 which is provided with a forwardly opening spray jet 43 to provide a more complete watering of the area of the lawn that lies directly in front of the sprinkler. As it is best seen in FIGURE 2, spray head 28 is provided with a plurality of perforations 42 over its entire length to allow water to flow therefrom in the form of sprays or jets.

A water flow control valve 44 is attached to the hydromotor water inlet passage 24 by means of coupling 46.

A flexible water conduit such as a conventional garden hose or similar structure (not shown) is attached to valve 44 by connector 48 for delivering water from a source (not shown) to the sprinkler.

As best seen in FIGURE 2, flow control valev 44 is of the conventional type that can be operated externally to open or close the flow passage extending therethrough. External operator arm or lever 50 is pivotally attached near one end to the valve plate (not shown) of valve 44 for moving the valve plate between the positions of "open" and "close" as indicated by markings on the valve body. Valve 44 can be operated automatically to shut off the flow of water through the valve when the sprinkler reaches the end of its travel in a manner to be described hereinafter.

Hydromotor 22 is provided internally with a rotor (not shown) that is rotated by the flow of water through the motor. A power take-off, in the form of a drive shaft 52 that is driven by rotation of the rotor, extends forwardly of hydromotor 22. Attached in non-rotating relation to drive shaft 52 is one end 53 of a relatively short arm or crank 54. End 55 of a second arm 56 is attached to the end 58 of crank 54 by means of bolt 60 and nut 62. A reel or spool 64 is non-rotatably attached to the forward end of bolt 60 and extends forwardly of crank 54 and arm 56 in a manner best shown in FIGURE 1. Alternatively, spool 64 can be made as an integral part of bolt 60. The end 65 of arm 56 is rotatably or pivotably connected to one end 66 of arm 68 by means of bolt or rivet 69. Arm 68 is attached to a slotted sleeve 70 that surrounds rearward end portion 30 of spray head 28 in a non-slip relation thereto. The purpose of the linkage consisting of crank 54, arm 56, arm 68 and sleeve 70 is to convert the rotational movement of drive shaft 52 into oscillating movement to oscillate the spray head 28.

A flexible line 72 for towing the sprinkler across a lawn is wound upon spool 64. Line 72 extends downwardly, substantially transverse to the longitudinal axis of the sprinkler body and perpendicular to the axis of spool 64, loops around a roller on pulley 74 rotatably attached to one of the runners 10, thence extends upwardly and inwardly through a centering loop 76, depending from the middle of gusset plate 38, and extends forwardly of the traveling sprinkler to a point of attachment to a stationary object such as stationary rod 78.

As spool 64 moves in a circular path around the axis of drive shaft 52 in response to rotation of shaft 52, line 72 is wound up on spool 64 thereby pulling the sprinkler toward the stationary rod 78.

The automatic water shut-off device consists of a relatively small diameter operating rod 80 one end 82 of which is attached to the outer end 84 of the operator lever 50 of water flow control valve 44. Rod 80 extends forwardly and inwardly of the sprinkler body and reciprocably passes through a retaining member 86, depending from near the middle of gusset plate 13. Loop 88 is provided on the forward end 90 of rod 80 for receiving therethrough line 72. Operating rod 80 functions to actuate operator lever 50 of control valve 44 from the open to the closed position when the sprinkler reaches the end of its travel in a manner to be further described hereinafter.

It should be noted that when operating rod 80 is used with loop 88 line centering loop 76 can be omitted since loop 88 will effectively center the line 72.

*Operation*

When the valve 44 is in the open position water is allowed to flow through the hydromotor 22, and through the perforations 42 in spray head 28 onto the ground. The impingement of this flowing water upon the rotor (not shown) encased within hydromotor 22 rotates drive shaft 52 thereby turning arm 54. As arm 54 is turned or rotated about the axis of shaft 52 spool 64 follows a circular path about the axis of drive shaft 52. As spool 64 is rotated line 72 is wound upon spool 64 thereby advancing the sprinkler toward the point (rod 78) at which the outer end of the line 72 is attached.

The rotational movement of shaft 52 is also applied through the linkage consisting of crank 54, arm 56, arm 68 and sleeve 70 to the spray head 28. This linkage converts the rotary movement of shaft 52 into oscillating movement of spray head 28.

It should be noted that there is commercially available an oscillation controlling device that can be connected into the above described linkage for varying the degree of oscillation of spray head 28 and the direction of the water sprays emanating therefrom.

When the sprinkler nears rod 78, loop 88 of operating rod 80 will contact rod 78. As the sprinkler advances still closer to stationary rod 78, operating rod 80 will be urged rearwardly with respect to the sprinkler. Rearward movement of rod 80 pivots operator lever 50 of valve 44 from the "open" position to the "closed" position. When valve 44 is closed, water no longer flows through hydromotor 22 therefore the sprinkler is shut off and will advance no further.

To place the sprinkler in operation again sufficient line is withdrawn from spool 64 and stationary rod 78 with line 72 attached thereto is moved forwardly of the sprinkler a predetermined distance. Rod 78 is then stuck into the ground to provide a stationary point of attachment of line 72 distant from the sprinkler. Valve 44 is then opened thereby putting the sprinkler in operation again.

It should be noted that flow control valve 44 and automatic operating device or rod 80 can be omitted from the sprinkler and the water source connected directly to water inlet 24 without departing from the spirit and scope of this invention. However, in the event that this automatically operable valve 44 is omitted, the sprinkler would not be shut off when it reached the end of its predetermined travel. Alternatively, the sprinkler can be provided with the control valve 44 but not with the operating arm 80 thereby making the sprinkler manually controllable but not automatically controllable.

Likewise, it may be desirable to incorporate within this sprinkler an automatically operable flow control means of conventional use today but not described herein.

It should be noted that although the body of the sprinkler is described as a sled-like structure any structure that will traverse the ground with a minimum of frictional drag can be used without departing from the scope of this invention. Such a body structure would include a substantially flat or box-like structure provided with ground contacting rollers on wheels.

Furthermore, it should be understood that stationary rod 78 is the preferred means for establishing a fixed or stationary point of contact for the foward end of string 76; it being contemplated that any other stationary object such as a tree, bush, house or heavy object could serve with equal utility.

Figures 4, 5, 7:
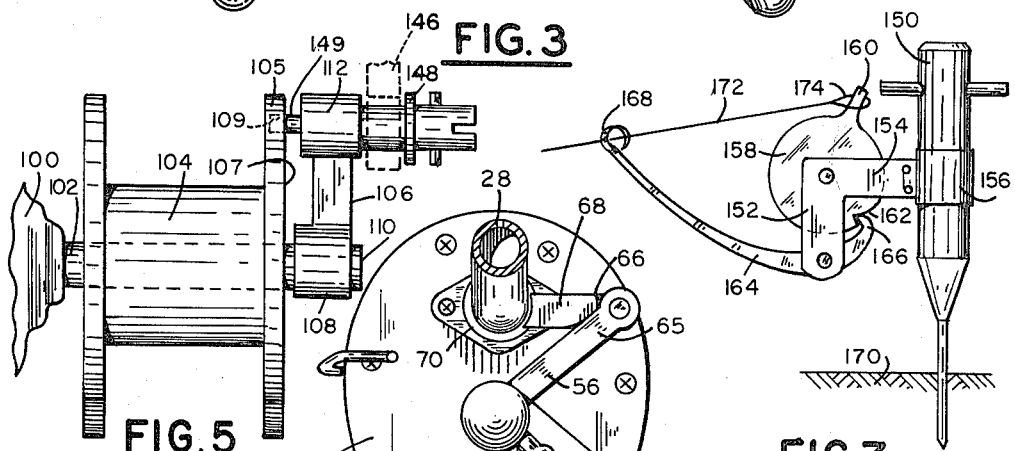
FIGURE 4 is a sectional view of the lawn sprinkler of FIGURE 1 taken along line 4—4.
FIGURE 5 is a partial side elevational view of an alternate embodiment of the lawn sprinkler of this invention.
FIGURE 7 is a side elevational view of an alternate embodiment of a mechanism for automatically stopping advancement of the lawn sprinkler of this invention.
Figure 6:
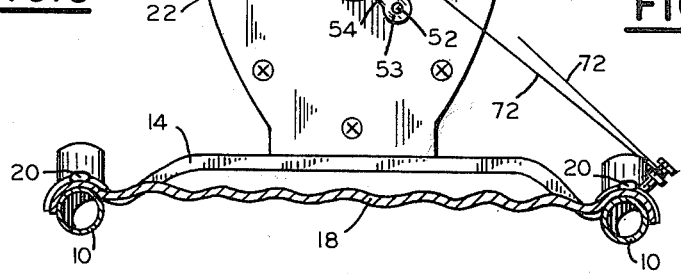
FIGURE 6 is a cross-sectional view of a portion of the drive mechanism for the lawn sprinkler of FIGURE 5.

Referring now to FIGURES 5 and 6, there is shown an alternate embodiment of a drive mechanism for the traveling lawn sprinkler of this invention. The power take-off from hydromotor 100 is in the form of an elongated forwardly extending drive shaft 102. Spool 104 is received about the external end portion of shaft 102. Spool 104 rides freely upon shaft 102, therefore it does not ordinarily rotate as shaft 102 rotates.

The forwardmost rim 105 of spool 104 is provided on its frontal face 107 with a forwardly opening bore 109, shown in phantom lines in FIGURE 5, the purpose of which will be described hereinafter.

A flexible line (not shown) similar to line 72 shown in FIGURES 1 and 2 for towing the sprinkler across a lawn is wound about spool 104, passes through the sprinkler body and is attached to a stationary point (not shown), distant from the sprinkler, as above described with reference to line 72.

A crank arm 106 is attached at one end 108 to the external end 110 of shaft 102 for rotation about the axis of shaft 102 in response to rotation of the shaft. End 112 of crank 106 is provided with a forwardly opening transverse bore 114 terminating rearwardly in an internally upset annular shoulder 116 that forms a rearwardly opening counter bore 118. The forward portion of bore 114 is provided internally with threads 120.

The externally threaded end 122 of a tubular mandrel 124 is threadably received within the forward portion of bore 114. The forward end portion of mandrel 124 is provided with two sets of diametrically opposite slots 126 and 128, with slots 128 extending farther rearwardly than do slots 126.

A locking pin 130 is reciprocally received within central passage 132 in mandrel 124 and extends reawardly through counterbore 118 in the end 112 of crank 106. Pin 130 is provided near its rearward end with an annular flange 134. A compression spring 136 surrounds pin 130 within bore 114 and extends between flange 134 and the end surface of the rearward end 122 of mandrel 124 to urge pin 130 in a rearward direction. A radially extending stop member 138 is threadably received within a transverse internally threaded bore 140 provided in the forward end portion of pin 130. Stop member 138 extends outwardly through one set of the two sets of slots 126 and 128 in the mandrel 124.

It should be noted that stop member 138 contacts the rearward shoulder 142 or 144 of slots 126 or 128, respectively, to limit the rearward movement at locking pin 130.

It must also be understood that since slots 126 and 128 terminate rearwardly at different distances, locking pin 130 can selectively occupy one of two positions, depending upon in which set of the slots stop member 138 is located. When member 138 is located in slots 128, pin 130 extends in its maximum rearward position, which position will be hereinafter referred to as the "engaged" position. When member 138 is located in slots 126 pin 130 will be described as in its "disengaged" position.

When pin 130 is in its "engaged" position its rearward end 149 extends into the bore 109 provided in rim 105 of spool 104 to effectively tie the crank arm 106 and mandrel 124 to the spool 104. Therefore, rotation of crank arm 106 about the axis of drive shaft 102 will cause the spool 104 to also be rotated about the axis of that shaft thereby winding the flexible line upon spool 104 resulting in advancement of the sprinkler across the lawn as above described.

When pin 130 is in the "disengaged" position the end 149 of pin 130 is withdrawn from bore 109. Therefore spool 104 is no longer tied to crank arm 106 and will not be rotated by the turning of the crank arm so that the sprinkler remains stationary while it sprinkles.

It should be noted that pin 130 is easily changed from one position to the other by simply grasping the exposed end of stop member 138 and pulling pin 130 forwardly against the biasing force of spring 136. When member 138 clears the slots 126 or 128 in which it is located, pin 130 is rotated 90° to register member 138 with the other set of slots. Member 138 is then released to allow the pin 130 to move rearwardly into its new position.

One end of an arm 146, shown in phantom lines in FIGURE 5, is pivotally attached to mandrel 124, between end 112 of crank arm 106 and the externally annular shoulder 148 provided on mandrel 124. Arm 146 is also pivotally connected to another arm (not shown) which is attached to the oscillating spray head (also not shown) thereby making up a mechanical linkage extending from the drive shaft 102 to the spray head to drive the spray head in the same manner as descried above with reference to FIGURES 1, 2, 3, and 4.

It should be obvious from the drawings and from the foregoing description that the sprinkler drive mechanism shown in FIGURES 5 and 6 allows for the manual conversion of a traveling lawn sprinkler into a stationary sprinkler and vice versa without otherwise altering the operation of the sprinkler. With this apparatus the sprinkler tow line can be attached to a distant stationary point (such as rod 78 in FIGURES 1 and 2) and the sprinkler will still operate stationary when the spool 104 is inactivated by moving pin 130 to the "disengaged" position.

Referring now to FIGURE 7 there is shown an alternate embodiment of an apparatus for automatically stopping advancement of the sprinker when it reaches the predetermined terminal point of its travel.

The device includes a rod 150, similar to rod 78 in FIGURES 1 and 2, which is located at the terminal point of the sprinkler's travel. An L-shaped support member 152 consisting of two spaced apart L-shaped legs, only one 154 of which can be seen in FIGURE 7 is attached to rod 150 by a collar 156. A disk 158 is rotatably supported in the space between the elbow of the two L-shaped legs. Disk 158 is provided at one point on its outer periphery with a radially extending spur 160. The periphery of disk 158 is also provided with a notch 162 at a point removed from the spur a peripheral distance of less than 180° in a clockwise direction.

A curved ratchet member 164 is pivotally attached to the support member 152, in the space between the free ends of the two L-shaped legs. Ratchet member 164 extends rearwardly of the point of attachment to support member 152 and terminates in a hook 166 that is directed radially inwardly toward the center of disk 158. Ratchet member 164 also extends forwardly of the point of attachment to support member 152 and terminates in a line guide loop 168.

In operation rod 150 is driven into the ground 170. Ratchet member 164 is pivoted to bring hook 166 into locking engagement with notch 162 to prevent counterclockwise rotation of disk 158. A flexible line 172 for towing the sprinkler (not shown) is passed through guide loop 168 on ratchet member 164. Line 172 is provided with an end loop 174 that is received about spur 160. With this arrangement line 172 is effectively tied to a stationary point (the rod 150) and can be used in advancing the sprinkler along its predetermined route as above described.

When the front portion of the sprinkler reaches the guide loop 168 on ratchet member 164, further advancement of the sprinkler will cause a ratchet member 164 to pivot in a clockwise direction about its point of attachment to the support member 152. When ratchet member 164 pivots sufficiently to move hook 166 out of locking engagement with notch 162, disk 158 will rotate in a counterclockwise direction due to the tension on line 172. Continued counterclockwise rotation of disk 158 will move spur 160 to a position that line loop 174 can slide off spur 160 thereby freeing line 172. When line 172 is freed from spur 160 advancement of the sprinker will cease.

It should be noted that the automatic stopping apparatus shown in FIGURE 7 will effectively stop advancement of the sprinkler when it reaches its predetermined terminal point without effecting the flow of water through the sprinkler and out of the oscillating spray head. That is, the sprinkler is converted into a stationary sprinkler at the end of its travel route. This apparatus might be preferred over the shut off apparatus described in reference to FIGURES 1, 2, 3, and 4 in that it does allow sprinkling to continue even after the sprinkler ceases to travel.

This invention provides a lawn sprinkler that can be caused to travel a predetermined route over a lawn or similar surface, sprinkling an area on both sides of the route with water. The preferred embodiment of the sprinkler includes means for automatically shutting off flow of water through the sprinkler when it reaches the end of its travel. One alternative embodiment of the invention provides means for stopping travel of the sprinkler when it reaches the end of its travel route but allows continuation of the flow of water through the sprinkler thereby automatically converting the traveling sprinkler into a stationary one. Finally another embodiment of the invention allows for the automatic conversion of the traveling sprinkler into a stationary one and vice versa.

The invention has been described by reference to specific and preferred embodiments. It will be apparent, however, that any modifications can be made without departing from the spirit and scope of the invention. Accordingly, this invention should be construed not to be limited to the embodiments herein described but should be limited only by the scope of the appended claims.

What is claimed:

1. A traveling lawn sprinkler comprised of in combination:
   a sprinkler body;
   an encased water operated motor having a water inlet and a water outlet and mounted upon said body, said motor being operated in response to the flow of water therethrough, and said motor being provided with a power take-off in the form of a rotating drive shaft extending externally of said motor;
   a spray head connected to said water outlet of said motor;
   a spool attached by means of a crank to said drive shaft whereby said spool is rotated by rotation of said drive shaft;
   a flexible line wound upon said spool and extending forwardly of said sprinkler to a stationary point of atachment distant from said sprinkler;
   said line being wound upon said spool as said spool is rotated by said drive shaft thereby reducing the length of line from said sprinkler to said stationary point to draw said sprinkler toward said stationary point.

2. In combination with a lawn sprinkler having means to advance itself on a lawn along a flexible line, a means for holding said line and for automatically stopping the travel of the sprinkler comprising:
   a rod extending vertically from the lawn;
   a support member attached to said rod and consisting of two parallel spaced apart substantially L-shaped legs;
   a disk rotatably mounted in the space between the elbows of the two L-shaped legs, said disk provided at one peripheral point with a radially outwardly extending spur and at a second peripheral point with a radially inwardly directed notch;
   an elongated ratchet member pivotally attached to said support member in the space between the free ends of said L-shaped legs, said ratchet member terminating in one end in a hook directed toward said disk to be received within said notch to lock said disk against rotation and terminating in the other end in a guide loop for receiving therethrough the free end of said flexible line;
   an end loop provided on the free end of said line and extending about said spur thereby to the said line to said rod;
   said ratchet member being pivoted in a direction to remove said hook from said notch when said sprinkler moves against said guide loop, releasing said disk for rotation to release said loop from said spur.

3. A traveling lawn sprinkler comprised of in combination:
   a sprinkler body;
   a water operated motor having a water inlet and a water outlet and mounted upon said body, said motor being operated in response to the flow of water therethrough, and said motor being provided with a power take-off in the form of a rotating drive shaft extending externally of said motor;
   an elongated spray head connected to said water outlet of said motor;
   a multi-arm mechanical linkage extending from said drive shaft to said spray head to convert the rotary motion of said drive shaft into oscillating motion for oscillating said spray head;
   a spool connected into said mechanical linkage such that rotation of said drive shaft causes rotation of said spool;
   a flexible line wound upon said spool and extending forwardly of said sprinkler to a stationary point of attachment distant from said sprinkler, said line being wound upon said spool as said spool is rotated by said drive shaft thereby reducing the length of line from said sprinkler to said stationary point to draw said sprinkler toward said stationary point.

4. A traveling lawn sprinkler comprised of in combination:
   a sprinkler body;
   a water operated motor having a water inlet and a water outlet and mounted upon said body, said motor being operated in response to the flow of water therethrough, and said motor being provided with a power take-off in the form of a rotating drive shaft extending externally of said motor;
   an elongated spray head pivotally connected to said water outlet of said motor;
   a spool coaxially received about the external extension of said shaft, said spool ordinarily being rotatable with respect to said shaft;
   a multi-arm mechanical linkage extending from said drive shaft to said spray head to convert the rotary motion of said drive shaft into oscillating motion for oscillating said spray head;
   said linkage including means for causing said spool to rotate in response to rotation of said drive shaft;
   a flexible line wound upon said spool and extending forwardly of said sprinkler to a stationary point of attachment distant from said sprinkler, said line being wound upon said spool as said spool is rotated by said drive shaft thereby drawing said sprinkler toward said stationary point.

5. A traveling lawn sprinkler according to claim 4, wherein said sprinkler is provided with a means for automatically stopping the travel of said sprinkler when said sprinkler reaches said stationary point, said means comprised of
   a valve located in said water inlet;
   an operating arm extending externally of said valve for controlling the flow of water through said valve;
   an operating rod attached at one end to said operating arm and extending forwardly of said sprinkler to contact said stationary point of attachment as said sprinkler nears said point whereupon further advancement of said sprinkler toward said point will urge said operating rod rearwardly to shut off flow of water through said sprinkler thereby stopping travel of said sprinkler.

6. A traveling lawn sprinkler according to claim 4, wherein said sprinkler is provided with a means for automatically stopping the travel of said sprinkler when said sprinkler reaches said stationary point, said means comprised of
   a rod extending vertically from the lawn;
   a support member attached to said rod and consisting of two parallel spaced apart substantially L-shaped legs;
   a disk rotatably mounted in the space between the elbows of the two L-shaped legs, said disk provided at one peripheral point with a radially outwardly extending spur and at a second peripheral point with a radially inwardly directed notch;
   an elongated ratchet member pivotally attached to said support member in the space between the free ends of said L-shaped legs, said ratchet member terminating in one end in a hook directed toward said disk to be received within said notch to lock said disk against rotation and terminating in the other end in a guide loop for receiving therethrough the free end of said flexible line;
   an end loop provided on the free end of said line and extending about said spur thereby to tie said line to said rod;
   said ratchet member being pivotal in a direction to remove said hook from said notch when said sprinkler moves against said guide loop, releasing said disk for rotation to a direction to release said loop from said spur to stop travel of said sprinkler.

References Cited by the Examiner

UNITED STATES PATENTS

| | | | |
|---|---|---|---|
| 1,142,448 | 6/15 | Lord | 239—189 |
| 1,176,856 | 3/16 | Salmond | 239—189 |
| 1,419,843 | 6/22 | Goodbar | 239—189 |
| 1,658,202 | 2/28 | Jones | 239—189 |
| 2,057,217 | 10/36 | Soper | 239—189 |
| 2,122,596 | 7/38 | Turner | 239—189 |
| 2,256,838 | 9/41 | Adamson | 239—189 |
| 2,660,472 | 11/53 | Rice | 239—190 |
| 2,693,390 | 11/54 | Spender et al. | 239—240 |
| 2,722,454 | 11/55 | Jepson | 239—189 |
| 2,914,255 | 11/59 | Jepson | 239—242 |
| 2,958,470 | 11/60 | Giwosky | 239—189 |
| 3,043,520 | 7/62 | Nelson | 239—191 |

FOREIGN PATENTS

| | | |
|---|---|---|
| 145,609 | 11/50 | Australia. |
| 332,308 | 1/21 | Germany. |

EVERETT W. KIRBY, *Primary Examiner*.